Patented June 25, 1935

2,006,020

UNITED STATES PATENT OFFICE 2,006,020

PROCESS FOR PREPARING A SUBSTANCE DERIVED FROM AN AMINO ALIPHATIC ACID AND PHENYLQUINOLINE ORTHO-CARBOXYLIC ACID WHICH IS CAPABLE OF LOWERING THE URIC ACID LEVEL

Hirsch Gregor Jacubson, Berlin-Charlottenburg, Germany

No Drawing. Application December 29, 1933, Serial No. 704,594. In Germany January 2, 1933

6 Claims. (Cl. 260—39)

This invention relates to a process for preparing a body derived from 2-phenylquinoline-4-carboxylic acid and an aminoaliphatic acid which is capable of lowering the uric acid level: the new substance is of particular value for treating ailments which result from an increase in the uric acid level, such as, for example, rheumatism and gout. It is already known to use 2-phenylquinoline-4-carboxylic acid as a remedy for gout. The use of this substance, however, is attended by the disadvantage that it is resorbed into the metabolic circuit only very slowly, and an accumulation of 2-phenylquinoline-4-carboxylic acid in the liver occurs which leads to disadvantageous consequences, permanent injury to the liver and poisoning.

Investigations carried out by the applicant have shown that this injurious action of 2-phenylquinoline-4-carboxylic acid in the body can be diminished if an aminoaliphatic acid can be coupled with the said 2-phenylquinoline-4-carboxylic acid, since in this way the necessary doses of 2-phenylquinoline-4-carboxylic acid can be diminished. The direct coupling of 2-phenylquinoline-4-carboxylic acid with the amino group of an aminoaliphatic acid is chemically possible, but is of no therapeutic value since the formation of aminoaliphatic acid and 2-phenylquinoline-4-carboxylic acid ceases before entry into the organism and consequently the whole complex is secreted before it can become active.

Surprisingly enough, a body of high surface tension activity, and which is consequently readily resorbable, can be obtained if the aminoaliphatic acid is coupled to a lipoid-soluble derivative of 2-phenylquinoline-4-carboxylic acid.

A suitable such derivative is that which is formed by the interaction of 2-phenylquinoline-4-carboxylic acid with monoethanolamine. In order to carry out the process for example a N/10 solution of each of the components is caused to interact and the alkalinity of the product of the reaction is then removed by addition of aminoaliphatic acid.

In making the new body it is preferred to use aminoacetic acid; however suitable products are also obtained when alanine, leucine, or aspartic acid are employed. In the following the invention is described with reference to the preferred aminoacetic acid (glycocoll), but the invention is not limited to the use of this acid, but embraces any water-soluble aminoaliphatic acid.

The new body opens up the possibility, whilst leaving the therapeutic components their specific properties, of producing a maximum effect with therapeutically minimum quantities owing to the high activation of the surface, and therefore increase in the resorption, the poisonous properties of the preparation being at the same time removed.

The rapid entry of the new body into organic cells can be demonstrated by a simple experiment. Into a wide-necked glass vessel are introduced 10 cc. of the new body and into another similar vessel 10 cc. of N/10 sodium salt of 2-phenylquinoline-4-carboxylic acid and aminoacetic acid. On the surface of the liquid in each vessel a small knot of wool, about 10 cm. long is placed. Whereas in the vessel containing the new body the knot immediately sinks, it swims on the surface for some time in the vessel containing the mixture.

*Example.*—24.91 g. of 2-phenylquinoline-4-carboxylic acid are caused to interact with 6.1065 g. of monoethanolamine which has been diluted with 50 g. of water. The alkalinity is approximately removed by addition of about 7.5 g. of aminoacetic acid. The reaction between the 2-phenylquinoline-4-carboxylic acid and the monoethanolamine acid probably proceeds according to the following equation, which also shows the probable constitutional formula of the new body.

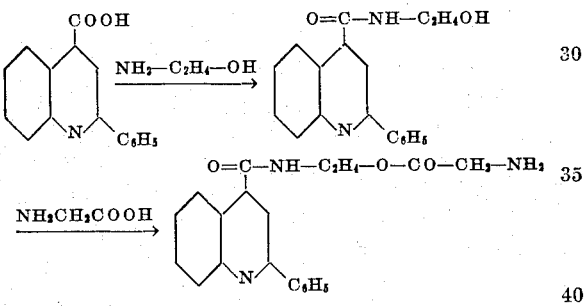

In order to prove the formation of the glycocoll with 2-phenylquinoline-4-carboxylic acid and ethanolamine the following experiment was carried out:—

24.91 g. of 2-phenylquinoline-4-carboxylic acid were mixed with 7.5 g. of aminoacetic acid and treated with 6.1065 g. of monoethanolamine and 50 cc. of water. The quantities used each correspond to $\tfrac{1}{10}$ mol. Evaporation was then effected under diminished pressure (in order to avoid high temperatures) at about 40°, when long brownish needle-shaped crystals gradually formed. After the crystallization the needles were dissolved in water and recrystallized. As a result of the recrystallization only slightly coloured crystals were finally obtained which were already soluble in water in the ratio of 1 to 1 and which possessed hygroscopic properties.

The recrystallized product was then subjected to a micro-elementary analysis in order to determine the nitrogen content. A quantity of 0.381 ccm. of nitrogen at 23° C. and 763 mm. was obtained; the concentration of the caustic potash amounted to 32.9%. The calculated nitrogen content of the new body on the basis of a molecular weight of 349.2 is 12.2%. The nitrogen content as determined by the elementary analysis was 12.99%.

As a result of the treatment described 2-phenyl-quinoline-4-carboxylic acid, insoluble in water according to the German "Arzneibuch 6", together with glycocoll has been converted by monoethanolamine into a new readily soluble body.

Experiments carried out in vitro have proved the superior effectiveness of the compound provided by the present invention in diminishing uric acid concentration. Biological experiments on mice also demonstrated the efficiency of the new preparation in reducing the uric acid level of the animal system.

What I claim is:—

1. A method of preparing a body capable of depressing the uric acid level consisting in interacting in aqueous solution equivalent quantities of 2-phenylquinoline-4-carboxylic acid and monoethanolamine, adding to the resulting reaction liquid, which contains a lipoid-soluble amide of 2-phenylquinoline-4-carboxylic acid, an equivalent quantity of an aqueous solution of a water-soluble aliphatic amino carboxylic acid, and removing from the solution the complex amino acid derivative formed.

2. A method of preparing a body capable of depressing the uric acid level consisting in interacting in aqueous solution equivalent quantities of 2-phenylquinoline-4-carboxylic acid and monoethanolamine, adding to the resulting reaction liquid, which contains a lipoid-soluble amide of 2-phenylquinoline-4-carboxylic acid, an equivalent quantity of an aqueous solution of aminoacetic acid and removing from the solution the complex amino acid derivative formed.

3. A preparation for depressing the uric acid level of the body consisting of 2-phenylquinoline-4-carboxylic acid monoethanolamine glycocoll.

4. A method of preparing a body capable of depressing the uric acid level consisting in interacting 2-phenylquinoline-4-carboxylic acid and monoethanolamine and coupling the product with a water-soluble aliphatic amino carboxylic acid.

5. A method of preparing a body capable of depressing the uric acid level consisting in interacting in aqueous solution equivalent quantities of 2-phenylquinoline-4-carboxylic acid and monoethanolamine, adding to the resulting reaction liquid, which contains a lipoid-soluble amide of 2-phenylquinoline-4-carboxylic acid, an equivalent quantity of an aqueous solution of alanine, and removing from the solution the complex amino-acid derivative formed.

6. A method of preparing a body capable of depressing the uric acid level consisting in interacting in aqueous solution equivalent quantities of 2-phenylquinoline-4-carboxylic acid and monoethanolamine, adding to the resulting reaction liquid, which contains a lipoid-soluble amide of 2-phenylquinoline-4-carboxylic acid, an equivalent quantity of an aqueous solution of leucine, and removing from the solution the complex amino-acid derivative formed.

HIRSCH GREGOR JACUBSON.